April 27, 1943. D. DOMIZI 2,317,447
CALENDER AND PROCESS FOR MAKING PLASTIC SHEETS
Filed July 18, 1940
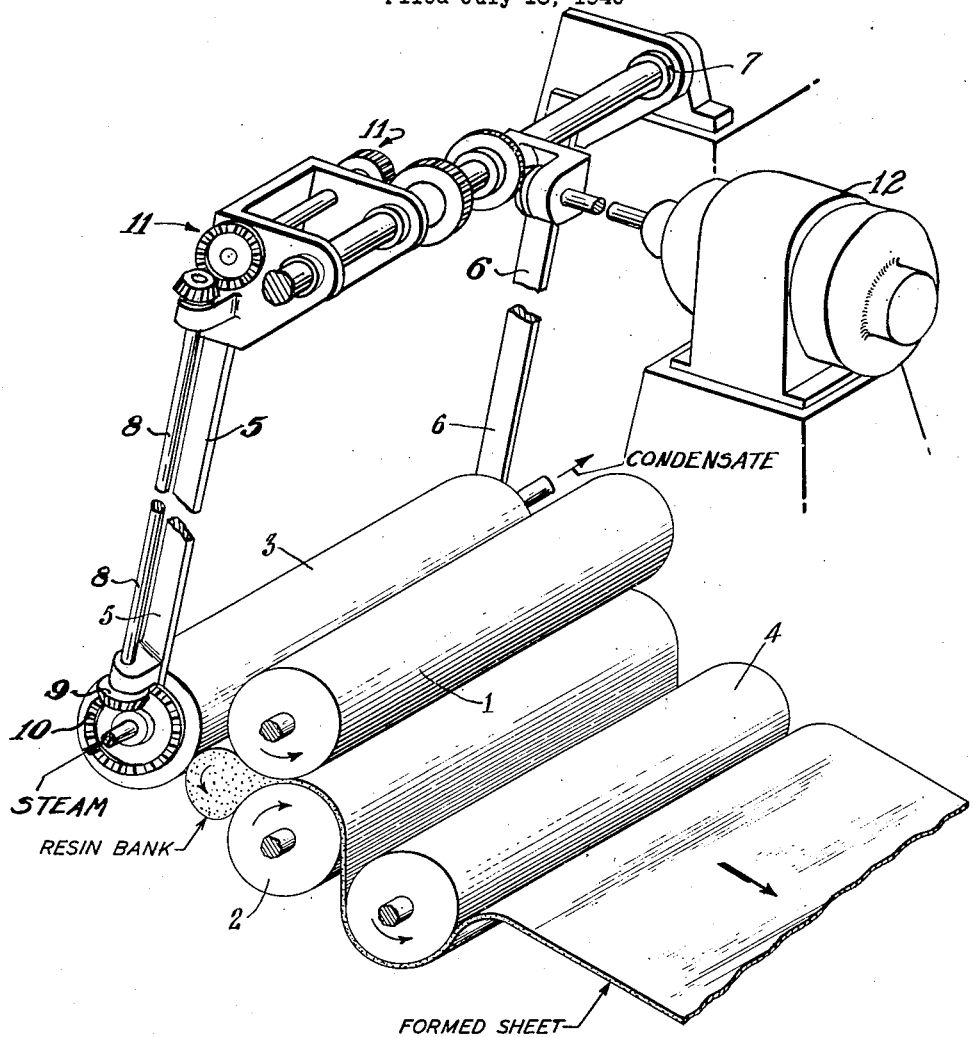
INVENTOR
DARIO DOMIZI
BY
ATTORNEY Patented Apr. 27, 1943

2,317,447

UNITED STATES PATENT OFFICE 2,317,447

CALENDER AND PROCESS FOR MAKING PLASTIC SHEETS

Dario Domizi, Parma, Ohio, assignor to Carbide and Carbon Chemicals Corporation, a corporation of New York Application July 18, 1940, Serial No. 346,131

12 Claims. (Cl. 18—10)

This invention relates to a process for making sheets from plastic compositions by the use of an improved calender. The improvements of this invention are of great significance in the formation by calendering of plastic sheets of the uniform thickness and high quality required for use as the reinforcing layer in safety glass. Sheets prepared from polyvinyl partial acetal resins combined with water-insoluble plasticizers are of outstanding utility for this purpose and it is to the preparation of sheets from plastic compositions derived from this type of resin that this invention is primarily directed.

Polyvinyl partial acetal resins may be prepared, for example, by the incomplete condensation of aldehydes with polyvinyl alcohol (obtainable by the saponification or hydrolysis of polyvinyl esters), and they contain, attached to the polymeric nucleus, both acetal groups and unreacted hydroxyl groups, and substantially no others. The degree to which the hydroxyl groups of the polyvinyl macromolecule have been combined with aldehyde may be indicated directly, and will be referred to herein as percent acetalization. Various methods have been proposed for making polyvinyl partial acetal resins, and the mode by which they originate is not essential to this invention.

In the case of the polyvinyl partial acetal resins and plasticized compositions containing them which are strongly adhesive, it has been extremely difficult to fabricate sheets of accurate and uniform thickness, and having surfaces free from defects, in addition to the primary requisite that the plasticized composition itself be homogeneous and of uniform density throughout. In combining the resin and plasticizer, the production of a perfectly uniform composition has required very long periods of mixing, even with the aid of heat, pressure and volatile solvents or non-solvents for the resin, due to the difficulty in achieving a perfectly even distribution of the plasticizer throughout the resin. Without this even distribution, the sheet has weak spots and shows marked optical distortion when used in laminated glass. When the resin has become sufficiently plasticized and is ready for rolling into sheets, its adhesive quality often causes it to stick to the rolls, or at least the sheet so formed has rough surface streaks and is of decidedly uneven thickness, or caliper. In addition, such sheets are extremely hard to handle. This is particularly true in such operations as assembling the sheets with glass for laminating because they stick to the glass so tenaciously wherever there is contact, that it is almost impossible to align the resin and glass sheets, or to smooth out the sheets to eliminate any ripples or air bubbles which might be between the layers.

By the process of this invention the resin and plasticizer may be combined into a perfectly transparent, homogeneous composition in a relatively short time and with a minimum of trouble. The composition may be rolled into smooth sheets of uniform caliper by means of an improved calender having an appropriate control member applying regulated pressure to the composition during its passage through the calender. These sheets may be handled conveniently without sticking to smooth surfaces with which they come in contact, although the resin regains fully its adhesive properties under moderate heat and pressure, such as are commonly employed in the fabrication of laminated glass structures.

In order to obtain plasticized polyvinyl partial acetal resins having great strength and extensibility, it is advisable that the resin be derived from a polyvinyl body of high molecular weight, such as polyvinyl alcohol or an ester thereof having a molecular weight in excess of about 10,000, and resins prepared from polyvinyl acetate having an average molecular weight of at least 25,000 are preferred. (Molecular weights referred to herein are calculated by means of Staudinger's formula from viscosity determinations of solutions of the materials.) The resin also must be insoluble in the plasticizer at ordinary temperatures, but at the same time capable of absorbing sufficient quantities of the plasticizer to render the resulting composition sufficiently pliable. In general, polyvinyl partial acetal resins acetalized between about 33% and 94% with aliphatic aldehydes having from 2 to 6 carbon atoms are capable of forming plasticized compositions of great strength and toughness when combined with suitable plasticizers. The most desirable resins are those which are acetalized between about 88% and about 94% with acetaldehyde; between about 52% and about 92% in the case of propionaldehyde; between about 42% and about 82% with butyraldehyde; between about 33% and about 62% with valeraldehyde; and between about 33% and about 44% with hexaldehyde. Of this group, especially valuable resins are those acetalized between 54% and 78% with butyraldehyde, between 62% and 88% with propionaldehyde, and between 39% and 58% with valeraldehyde, in the order named.

These resins are, in general, insoluble at ordinary temperatures (below 40° C.) in water-insoluble liquids, such as aliphatic and aromatic hydrocarbons, ethylene dichloride, chloroform, methylene chloride, ethyl acetate, etc., with the exception that portions of the more highly acetalized resins described may dissolve in certain chlorinated hydrocarbons. It is believed that this partial solubility of the more highly acetalized resins may be due to the fact that every polyvinyl macromolecule in the resin mass may not be combined with the same amount of aldehyde as every other macromolecule, so that certain of them may really be acetalized sufficiently highly as to be extracted from the resin mass by the chlorinated hydrocarbon. These resins are, in general, soluble in water-soluble liquids, such as alcohols, glycol monoalkyl ethers, and the like, except polyvinyl valeraldehyde acetal resins which are insoluble in the lower alcohols. Like the chlorinated hydrocarbons, ketones are capable of dissolving portions of the more highly acetalized resins. None of these resins is in any case soluble in water, although they are capable of absorbing relatively small amounts of it.

Since these resins are not dissolved by most ester plasticizers, and at the same time have the unique property of dissolving (or absorbing) sufficient quantities of ester plasticizers to yield adequately softened compositions, they may be compounded with most water-insoluble plasticizers to yield colloidal compositions having excellent clarity, adhesiveness and lasting qualities of flexibility, resilience and extensibility coupled with great strength and toughness.

The particular resins which are preferred for use in this invention form the subject matter of Patents 2,162,678, 2,162,679 and 2,162,680, issued June 13, 1939, in the name of H. F. Robertson, and their use in the manufacture of laminated non-shattering glass is described in Patent 2,120,628 issued June 14, 1938, in the name of E. W. Reid.

However, the process of this invention is directed generally to the fabrication of clear and homogeneous sheets from those polyvinyl partial acetal resins which are sufficiently acetalized to be water-insoluble (although not incompatible with relatively small amounts of water), yet insufficiently acetalized to be insoluble in aromatic and aliphatic hydrocarbons. In addition, the resins must be capable of absorbing sufficiently large quantities of water-insoluble plasticizers to render the resulting composition pliable.

If the resin and plasticizer are combined under heat and pressure, with or without the aid of volatile mutual solvents, great difficulty is experienced in getting the plasticizer to penetrate the resin uniformly, especially since the plastic mass sticks to all parts of the mixer. The latter trouble has been overcome and the former obstacle lessened by the improvement which consists in combining the resin and plasticizer in the presence of water in amounts sufficient to wet and swell the resin.

When the resin has become uniformly penetrated by the plasticizer, the temperature of the mixture is adjusted to that suitable for calendering into sheets and the water content adjusted to between 5% and 10% by weight. Upon securing a uniform dispersion of the plasticizer in the resin, the mass may be passed directly between the calender rolls, although it is often more expedient to pass the material into a roll mill, the more accurately to adjust the temperature and water content of the mass and to reduce it to a shape more easily fed to the calender. The temperature at which the resin is fed to the calender will vary largely according to the type of rolls used, but in general it should be between 65° and 80° C. Proper dusting of the calendered plastic to prevent adhesion of the sheets to each other is advisable where an appreciable amount of subsequent handling, or shipment, is contemplated. Most efflorescent alkaline salts are suitable for this purpose, of which may be mentioned borax and sodium bicarbonate.

These improvements are described in Patents 2,120,934 and 2,120,935 issued June 14, 1938, in the name of Frazier Groff.

Clear and perfectly homogeneous compositions are more easily formed if the resin and plasticizer are mixed, in the presence of water, at a temperature well below the fluxing temperature of the resin and plasticizer, until the latter is completely and evenly dispersed throughout the mass. This operation may be conducted most conveniently and quickly at about room temperature, although the temperature of the mass may be raised up to the point of incipient agglomeration of the resin particles, if desired. At higher temperatures the resin particles tend partially to flux and form aggregates into which subsequent penetration of the plasticizer is very slow.

In forming sheets from a plastic composition of this nature by calendering, an appropriate charge of the plastic material is ordinarily placed between the forming rolls of the calender. The material becomes engaged in the rolls and the part of the mass not passing through the rolls is mechanically transformed to a roll or bank of material which normally rotates in contact with the rolls. If such is not the case, the bank may be caused to roll either by varying the peripheral speed, or the temperature of one roll with respect to the other, or by maintaining a slightly smoother surface on one of the rolls and rotating them at the same speed and temperature. Guides are customarily provided at the extremities of the rolls to prevent any lateral movement of this bank of plastic material. If the rolls of the calender machine have a smooth surface, the rolls will grip or "bite" the resin composition unevenly which results in sheets of non-uniform thickness. This action may be ascribed to a lack of adhesion between the smooth surface of the rolls and the plastic composition which may cause the pressure exerted on the sheet being formed to vary somewhat during the operation with a consequent lack of uniformity in the thickness of the sheet.

It has been found that the unevenness in sheets calendered from plastic compositions can be corrected by the use of an improved calender. This machine is illustrated in the schematic drawing in which rolls 1 and 2 are the forming rolls of any standard calender, which are mounted in an appropriate frame having a drive mechanism adapted to rotate the rolls in opposite directions and having means for adjusting the clearance between the rolls. The position of the bank of resinous composition, when the machine is in operation, is at one side of and contiguous to the forming rolls as indicated in the drawing, that is, the resin bank is in the bight between the rolls 1 and 2.

The improvement of this invention resides in the use of a control element, preferably a roll, as illustrated by roll 3 of the drawing, which is adapted to be placed parallel to the axes of the forming rolls 1 and 2 and in pressure-exerting contact with substantially the entire bank of plastic composition in the bight between them. The control roll 3, in the preferred form of the invention, is suspended between two arms 5 and 6 which are attached to the frame of the machine by pivots, for instance as shown at 7. Suitable means for rotating the control roll 3 may be provided. For example, a shaft 8 carried by the arm 5 may drive the roll 3 by means of gears 9 and 10 and be, in turn, driven by gear train 11 and motor 12. This arrangement permits the control roll 3 to remain in tangential contact with the bank of plastic composition as the bank becomes smaller, as the plastic composition passes through the rolls, or as it becomes greater, as fresh material is added to the machine. Suitable safety stops (not shown) are provided on the frame to engage the supporting arms 5 and 6 in order to prevent the control roll 3 from rubbing against the forming rolls 1 and 2 should the bank of plastic composition become very small.

The essential function of the control element is the exertion of pressure on the bank of plastic composition which insures that the material is uniformly gripped by the forming rolls. This pressure is regulated by adjusting the weight and size of the roll or by adding additional weights to the arms on which the control roll is supported. The pressure which the control element is to supply may also be furnished by means of a spring acting to force the control element against the bank of plastic material. The tension of the spring should desirably be regulated so that the control element will move in accordance with the size of the bank and remain in tangential contact therewith.

The essential function of the control element being the exertion of pressure against the bank of plastic material, it is not necessary that it be a roll; a flat bar would also function. Moreover, it is not necessary that the control roll, if such is the control element used, rotate, but more effective control of the sheet thickness is effected if the control roll rotates at a constant speed in the opposite direction from that of the bank. However, satisfactory control can still be obtained if the control roll rotates in the same direction as does the bank of plastic in the bight between the forming rolls. If the forming rolls are required to be heated for handling certain plastic compositions, such as the polyvinyl partial acetal resin compositions previously described, it is also desirable that the control roll be heated to assist in maintaining such plastic compositions at the desired temperature and moisture content. Any conventional heating means may be employed for this purpose. The control roll also acts to prevent vibration of the machine which is sometimes present because of the tendency of plastic compositions, particularly those of an elastic nature, to slip when engaged in the rolls. When the plastic composition being calendered is heated during the formation of the sheet, it is preferable that a cooling roll, identified as roll 4 in the drawing, be included in the calender in order to facilitate subsequent handling of the plastic sheet.

When sheets from polyvinyl partial acetal compositions, such as those of the quality required as the reinforcing layer in safety glass, are to be prepared it is necessary that the forming rolls of the calender be surfaced as described in my Patent No. 2,279,901, granted April 14, 1942, on copending application Serial No. 218,392, filed July 9, 1938, with which this application contains subject matter in common. The surfaces of the rolls may be of iron, although a more corrosion-resistant metal surface on the rolls, such as nickel or chromium, is preferred. In any case, the rolls should have a specially roughened surface, such as may be obtained by sandblasting. An etched surface can be used, but a surface such as that obtained by sandblasting smooth steel shafting, is preferred. If a rougher surface is used, the resin will tend to stick to the rolls, and a materially smoother surface causes the rolls to grip or "bite" the resin unevenly, which in either case results in the production of sheets of non-uniform caliper. In addition, the plastic sheet obtained from the polished rolls has so smooth a surface as to stick tenaciously to other smooth surfaces, such as glass, with which it comes in contact. By the action of the roughened rolls described, a matte or dull finish is imparted to the surfaces of the plastic sheet which enables it to be placed in contact with other smooth surfaces and adjusted thereon without difficulty of unwanted or premature adhesion.

Optimum results are obtained if the lower forming roll is of a roughened nickel surface and the upper forming roll is of a roughened chromium surface, the latter being slightly smoother than the former so that the bank of resin will rotate in the same direction as the chromium surfaced roll. The temperature of the calender rolls depends to some extent upon the moisture content and temperature of the polyvinyl partial acetal composition passed through the calender. When these properties have the values previously indicated, the preferred temperature of the forming rolls is between 70° to 80° C., and that of the control roll is about 70° C.

The resin sheet emerging from the calender contains a greater amount of moisture than is desirable for the fabrication of laminated glass. This moisture may largely be removed in any type of air drier wherein the air circulation is sufficiently high to dry the sheet in a fairly short time without excessive temperatures. Preferably the sheet should be dried to approximately 1% moisture in a forced air drier of the conveyor type. Six to eight minutes at 60° to 90° C. is sufficient for most operations.

The addition of the control roll to the installation just described, which is more fully explained and specifically claimed in my copending application above referred to, has resulted in certain specific improvements. When both of the forming rolls have a roughened surface, in order to impress a matte or dull finish on both sides of the plastic sheet, the plastic composition has a tendency to adhere to both rolls. This occasionally results in the rolls exerting an uneven action on the plastic composition which causes rough and irregular spots to occur at random points through a roll of finished product. However, these defects are not nearly as serious as those which exit when smooth forming rolls are used. By exerting pressure on the bank of resin composition, the control roll causes the forming rolls to grip or "bite" the composition evenly so that a sheet of uniform caliper with a dull or matte finish on each side results. In addition, it is no longer desirable to have the plastic composition pass through the rolls at a higher temperature than the rolls themselves in order to produce sheets of the most uniform character. The temperature of the plastic composition may be 65° to 80° C. which avoids the formation of blisters in the sheet caused by escape of volatile liquids.

The control roll, by exerting regulated, continuous and substantially uniform pressure on the entire length of the bank of material between the forming rolls, permits four times as large a batch of material to be handled at one time in a given size equipment than was possible before. This enables plastic sheets of the standard commercial length, about 675 feet, to be fabricated as a continuous roll without the necessity for splicing. Also, the plastic composition may be placed in the machine in materially less time by laying masses of the plastic composition on top of the rotating control roll which then forces the material into the bight between the forming rolls. The entire operation may be carried out as a batch, semi-batch, or continuous process as desired.

Modifications of the invention exist other than as specifically shown in the drawing. For instance, three forming rolls may be arranged so that the plastic composition is passed between the upper and the middle roll, around one-half of the circumference of the middle roll and back between the middle roll and the lower roll. In such instance, the upper roll may be smooth and the middle and lower rolls roughened so that the matte finish will be impressed on each side of the plastic sheet during separate passage through the rolls. The bank may be between either the upper and the middle rolls, or between the middle and lower rolls, or both, with a control roll acting as described on at least one bank.

Other modifications of the invention will be apparent to those skilled in the art and are included within the scope of the invention as defined by the appended claims.

I claim:

1. A calender for forming plastic sheets of uniform thickness from a bank of unsheeted plastic material comprising, in combination, forming rolls adapted to receive said bank of plastic material in a bight between said rolls, means for rotating said forming rolls, a control member for urging said bank into said bight, pivoted arms for supporting said control member in a position parallel to said forming rolls, said control member being so constructed and arranged that it is adapted to move in conformity with variation in thickness of the bank of plastic material in said bight of said forming rolls.

2. A calender for forming plastic sheets of uniform thickness from a bank of unsheeted plastic material comprising, in combination, forming rolls adapted to receive said bank of plastic material in a bight between said rolls, means for rotating said forming rolls, a control roll for urging said bank into said bight, pivoted arms for supporting said control roll in a position parallel to said forming rolls, said control roll being so constructed and arranged that it is substantially coextensive with said forming rolls and is adapted to move in conformity with variation in thickness of the bank of plastic material in said bight of said forming rolls.

3. A calender for forming plastic sheets of uniform thickness from a bank of unsheeted plastic material comprising, in combination, forming rolls adapted to receive said bank of plastic material in a bight between said rolls, means for rotating said rolls, a control roll for urging said bank into said bight, pivoted arms for supporting said control roll in a position parallel to said forming rolls, said control roll being so constructed and arranged that it is adapted to move in conformity with variation in thickness of the bank of plastic material in said bight of said forming rolls, at least one of said forming rolls having a matte or frosted surface of a metal selected from the group consisting of nickel and chromium.

4. A calender for forming plastic sheets of uniform thickness from a bank of unsheeted plastic material comprising, in combination, two forming rolls, means for rotating said rolls adapted to receive said bank of plastic material in a bight between said rolls, a control roll for urging said bank into said bight, pivoted arms for supporting said control roll in a position parallel to said forming rolls, said control roll being so constructed and arranged that it is adapted to move in conformity with variation in thickness of the bank of plastic material in said bight of said forming rolls, one of said rolls having a matte or dull surface of nickel, the other having a matte or dull finish of chromium.

5. A calender for forming plastic sheets of uniform thickness from a bank of unsheeted plastic material comprising, in combination, forming rolls adapted to receive said bank of plastic material in a bight between said rolls, means for rotating said rolls, a control roll for urging said bank into said bight, pivoted arms for supporting said control roll in a position parallel to said forming rolls, said control roll being so constructed and arranged that it is adapted to move in conformity with variation in thickness of the rotating bank of plastic material in said bight of said forming rolls, and means for rotating said control roll in a direction opposite to that of said bank.

6. Process for forming sheets from a bank of unsheeted polyvinyl partial acetal resin composition, which comprises engaging said bank in a bight between forming rolls, and exerting continuous pressure along the entire length of said bank to urge the latter into said bight, such urging pressure being substantially uniform during the entire forming operation.

7. Process for forming sheets of uniform thickness from a bank of unsheeted polyvinyl partial acetal resin composition, which comprises engaging said bank in a bight between forming rolls, and exerting tangential force on said bank to urge the latter into said bight, said force being continuously and substantially uniformly applied to the entire length of said bank during the forming operation.

8. Process for forming sheets of uniform thickness and with a dull or matte finish from a polyvinyl partial acetal resin composition, which comprises engaging a bank of an unsheeted mass of said composition in a bight between forming rolls of which at least one has a matte or frosted finish, adjusting the clearance and speed of said rolls so that said bank rotates in said bight, and exerting pressure on such rotating bank to urge the latter into said bight, said pressure being substantially uniform during the entire forming operation.

9. Process for forming sheets of uniform thickness and with a dull or matte finish from a bank of unsheeted polyvinyl partial acetal resin composition, which comprises engaging said composition in a bight between forming rolls of which at least one has a matte or frosted finish, adjusting the clearance and speed of said rolls so that said bank rotates in contact with said rolls, and exerting pressure on said rotating bank to urge the latter into said bight, said pressure being substantially uniform during the entire forming operation, said polyvinyl partial acetal resin being of the group of those acetalized between about 88% and about 94% with acetaldehyde; between about 52% and about 92% with propionaldehyde; between about 42% and about 82% with butyraldehyde; between about 33% and about 62% with valeraldehyde; and about 33% and about 44% with hexaldehyde.

10. A calender for making plastic sheets of uniform surface characteristics and thickness comprising, in combination, rolls for forming said sheets from a bank of unsheeted plastic material in the bight of said rolls; and a control member disposed parallel to the axes of said forming rolls for applying continuous and substantially uniform pressure to said bank along its entire length to urge said bank into said bight, said control member including means for maintaining such urging pressure on said bank substantially uniform during the forming operation.

11. A calender for making plastic sheets of uniform surface characteristics and thickness comprising, in combination, rolls for forming said sheets from a bank of unsheeted plastic material in the bight of said rolls; and a control roll disposed parallel to the axes of said forming rolls and in pressure-exerting tangential contact with said bank along substantially its entire length for urging the latter continuously and substantially uniformly into said bight, said control roll including means for maintaining such urging pressure on said bank substantially uniform during the forming operation.

12. A calender for making plastic sheets of uniform surface characteristics and thickness comprising, in combination, rolls for forming said sheets from a bank of unsheeted plastic material in the bight of said rolls; and a control member disposed in contact with said bank of plastic material, said member being so constructed and arranged as to urge the bank of plastic material continuously and uniformly into engagement in the bight of said rolls and to move toward and away from said rolls in conformity with variation in size of said bank.

DARIO DOMIZI.